United States Patent
Guo (10) Patent No.: US 9,870,626 B2
(45) Date of Patent: Jan. 16, 2018

(54) DETERMINING A DOMINANT COLOR OF AN IMAGE BASED ON PIXEL COMPONENTS

(71) Applicant: Flipboard, Inc., Palo Alto, CA (US)

(72) Inventor: Meng Guo, San Jose, CA (US)

(73) Assignee: Flipboard, Inc., Palo Alto, CA (US)

(*) Notice: Subject to any disclaimer, the term of this patent is extended or adjusted under 35 U.S.C. 154(b) by 0 days.

(21) Appl. No.: 15/385,396

(22) Filed: Dec. 20, 2016

(65) Prior Publication Data

US 2017/0103547 A1    Apr. 13, 2017

Related U.S. Application Data

(63) Continuation of application No. 14/571,140, filed on Dec. 15, 2014, now Pat. No. 9,576,554.

(51) Int. Cl.
| | |
|---|---|
| *G06K 9/00* | (2006.01) |
| *G06T 7/90* | (2017.01) |
| *G06K 9/62* | (2006.01) |
| *G06T 7/60* | (2017.01) |
| *G06Q 30/00* | (2012.01) |

(52) U.S. Cl.
CPC .............. G06T 7/90 (2017.01); G06K 9/6215 (2013.01); G06K 9/6267 (2013.01); G06T 7/60 (2013.01); *G06K 9/6218* (2013.01); *G06T 2207/10024* (2013.01)

(58) Field of Classification Search
USPC ........ 382/100, 103, 106, 162–167, 172–173, 382/255, 181, 189–194, 209, 219, 224, 382/232, 254, 274–276, 286–291, 305, 382/312; 706/52; 705/26.61; 348/207.2
See application file for complete search history.

(56) References Cited

U.S. PATENT DOCUMENTS

| | | | | |
|---|---|---|---|---|
| 8,805,110 B2* | 8/2014 | Rhoads | ............ | G06F 17/30241 |
| | | | | 382/255 |
| 2009/0238464 A1* | 9/2009 | Ohira | ................. | G06K 9/00449 |
| | | | | 382/190 |
| 2010/0253790 A1* | 10/2010 | Hayasaki | ................ | H04N 1/387 |
| | | | | 348/207.2 |
| 2013/0132236 A1* | 5/2013 | Gokturk | ............ | G06F 17/30256 |
| | | | | 705/26.61 |
| 2014/0188780 A1* | 7/2014 | Guo | ........................ | G06N 7/005 |
| | | | | 706/52 |

* cited by examiner

*Primary Examiner* — Seyed Azarian
(74) *Attorney, Agent, or Firm* — Fenwick & West LLP (57) ABSTRACT

A digital magazine server determines a dominant color present in an image using a clustering algorithm. Color components of each pixel in the image are identified used to generate vectors associated with each pixel. Based on the vectors associated with the pixels, clusters including one or more pixels are generated using a clustering algorithm (e.g., k-means). The digital magazine server generates a characteristic vector for each cluster based on the vectors included in the cluster and selects a set of clusters based on their characteristic vectors. A centroid identifying the dominant color of the image is determined from the characteristic vectors of clusters in the set.

16 Claims, 3 Drawing Sheets

FIG. 4

DETERMINING A DOMINANT COLOR OF AN IMAGE BASED ON PIXEL COMPONENTS

CROSS REFERENCE TO RELATED APPLICATIONS

This application is a continuation of U.S. application Ser. No. 14/571,140, filed Dec. 15, 2014, now U.S. Pat. No. 9,576,554, which is incorporated by reference in its entirety.

BACKGROUND

This invention relates generally to image analysis, and more specifically to determining a dominant color of an image.

A digital magazine server provides digital content to its users via a digital magazine having various pages that each includes content items and information describing positioning of content items relative to each other. Digital content included in a digital magazine frequently includes images. To enhance user interaction with content items presented in a page of the digital magazine, the digital magazine server often includes text providing additional information about an image in the image itself. Additionally, including text in an image may allow the digital magazine server to reduce an image's size by using the text to describe content associated with the image, which may increase the number of content items presented in a page of the digital magazine. However, conventional methods for including text in an image often result in the text being illegible or obscured based on colors of the image.

SUMMARY

A digital magazine server obtains an image for presentation to a user that includes a set of pixels. For example, the image is received from a source providing content items to the digital magazine server (e.g., another user of the digital magazine server). The image is represented using a color model such as red-green-blue (RGB) or cyan-magenta-yellow-black (CMYK). Based on the color model, each pixel in the image is represented by a number of color components that each correspond to a color and have a color value specifying an intensity of the color corresponding to a color component.

To identify a dominant color of the image, the digital magazine server identifies one or more of the color components associated with each pixel in the set of pixels. For example, one or more color components specified by a color model associated with the image and their associated color values for various pixels of the image are identified by the digital magazine server. The one or more color components may be extracted from the image, may be identified based on data associated with the image by the digital magazine server, or may be identified based on additional information received from a source associated with the image.

Based at least in part on the identified one or more color components associated with a pixel, the digital magazine server generates a vector for the pixel. The digital magazine server generates a vector for each pixel in the image in some embodiments. Thus, a vector associated with a pixel is determined based on a vector space having a number of dimensions defined by a number of the identified color components. The vector associated with a pixel is then based on coordinates in the vector space corresponding to color values of identified color components corresponding to each dimension in the vector space. In some embodiments, color components associated with one or more pixels having less than a threshold distance to a pixel are used when generating the vector associated with the pixel. For example, identified color components associated with pixels adjacent to a pixel are used when determining the vector associated with the pixel, or identified color components associated with additional pixels within a threshold number of pixels from the pixel are used when generating the vector associated with the pixel. Identified color components associated with the pixel and with additional pixels within the threshold distance of the pixel may be differently weighted when generating the vector associated with the pixel. Similarly, identified color components associated with different pixels within the threshold distance of the pixel may be differently weighted; for example, identified color components associated with a pixel having a greater distance from the pixel may be associated with a lower weight than identified color components associated with a pixel having a smaller distance from the pixel.

Using the generated vectors, the digital magazine server generates one or more clusters, with each cluster including one or more pixels. In one embodiment, K-means clustering is used to generate the one or more clusters based on the generated vectors associated with various pixels. Using K-means clustering determines whether a pixel is included in a cluster based on the distance between a vector associated with the pixel and a mean value associated with the cluster. For example, a pixel associated with a vector having less than a threshold distance between the vector and a mean value associated with the cluster is included in the cluster. A cluster may also be associated with a threshold number of pixels associated with the cluster, a threshold magnitude (i.e., a sum of magnitudes of vectors associated with pixels included in the cluster is less than or equal to the threshold magnitude), a threshold distance from a mean value of the cluster, or any combination thereof. In other embodiments, alternative clustering methods may be used to generate the clusters. Examples of alternative clustering methods include: a balanced iterative reducing and clustering using hierarchies (BIRCH) method, a hierarchical method, an expectation-maximization (EM) method, a density-based spatial clustering of applications with noise (DBSCAN) method, an ordering points to identify the clustering structure (OPTICS) method, or a mean-shift clustering method.

Based on the generated vectors associated with pixels included in each cluster, the digital magazine server generates characteristic vectors for each cluster. A characteristic vector for a cluster represents a color associated with the cluster based on dimensions of the characteristic vector. The characteristic vector for the cluster is based on combinations of one or more dimensions of the generated vectors associated with pixels included in the cluster. For example, the characteristic vector for the cluster is a sum or a weighted sum of dimensions of vectors associated with pixels included in the cluster.

The digital magazine server selects a set of the clusters based at least in part on the characteristic vectors. In one embodiment, the digital magazine server ranks clusters based on magnitudes of their characteristic vectors and selects the set of clusters as clusters having at least a threshold position in the ranking. Alternatively, the digital magazine server selects clusters having characteristic vectors having at least a threshold magnitude. In other embodiments, a score is generated for each cluster based on a magnitude of a cluster's characteristic vector, a dimension of the cluster's characteristic vector, a number of pixels in the cluster, or any combination thereof. The digital magazine server selects clusters having at least a threshold score or ranks clusters based on their scores and selects clusters having at least a threshold position in the ranking.

Based on the characteristic vectors for each cluster in the selected set of clusters, the digital magazine server determines a centroid that identifies a dominant color associated with the image. Alternatively, the digital magazine server selects a cluster based at least in part on the characteristic vector of the cluster identifies the characteristic vector of the selected cluster as identifying the dominant color associated with the image. For example, the digital magazine server selects a cluster from the set of clusters including a maximum number of pixels and identifies the characteristic vector of the selected color as identifying the dominant color associated with the image.

The digital magazine server stores information associating the dominant color with the image. In some embodiments, the digital magazine server modifies the image based at least in part on the dominant color. For example, the digital magazine server modifies the image to include elements based on the dominant color of the image. As an example, when overlaying a text element in an image associated with a dominant color of red, the digital magazine server selects a color of the text element different than the dominant color of red, such as a color that is a complementary color of red or any other suitable color. The digital magazine server may also select additional content items for presentation to the user along with the image based on the dominant color associated with the image.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A digital magazine server retrieves content from one or more sources and generates a personalized, customizable digital magazine for a user based on the retrieved content. The generated digital magazine is retrieved by a digital magazine application executing on a computing device (such as a mobile communication device, tablet, computer, or any other suitable computing system) and presented to the user. For example, based on selections made by the user and/or on behalf of the user, the digital server application generates a digital magazine including one or more sections including content items retrieved from a number of sources and personalized for the user. The generated digital magazine allows the user to more easily consume content that interests and inspires the user by presenting content items in an easily navigable interface via a computing device.

The digital magazine may be organized into a number of sections that each include content having a common characteristic (e.g., content obtained from a particular source). For example, a section of the digital magazine includes articles from an online news source (such as a website for a news organization), another section includes articles from a third-party-curated collection of content associated with a particular topic (e.g., a technology compilation), and an additional section includes content obtained from one or more accounts associated with the user and maintained by one or more social networking systems. For purposes of illustration, content included in a section is referred to herein as "content items" or "articles," which may include textual articles, pictures, videos, products for sale, user-generated content (e.g., content posted on a social networking system), advertisements, and any other types of content capable of display within the context of a digital magazine.

System Architecture

Figure 1:
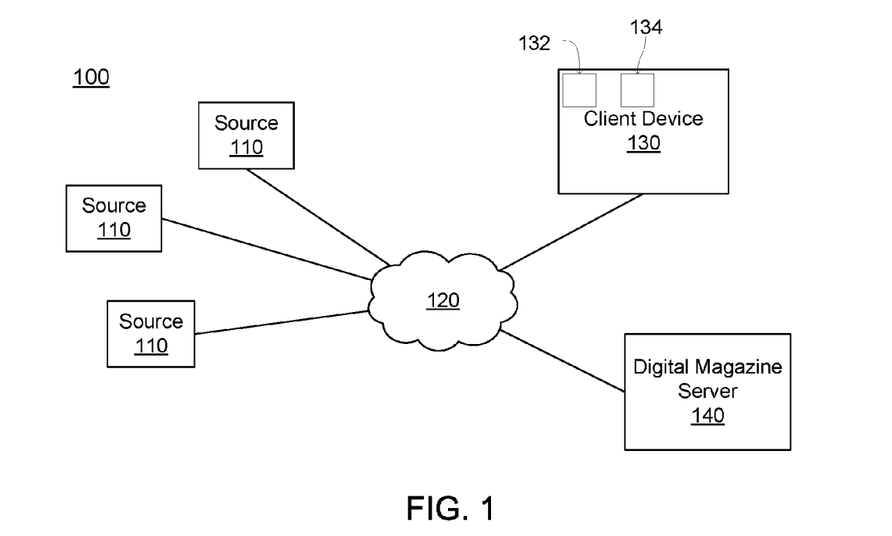
FIG. 1 is a block diagram of a system environment in which a digital magazine server operates, in accordance with an embodiment of the invention.

FIG. 1 is a block diagram of a system environment 100 for a digital magazine server 120. The system environment 100 shown by FIG. 1 comprises one or more sources 110, a network 120, a client device 130, and the digital magazine server 140. In alternative configurations, different and/or additional components may be included in the system environment 100. The embodiments described herein can be adapted to online systems that are not digital magazine severs 140.

A source 110 is a computing system capable of providing various types of content to a client device 130. Examples of content provided by a source 110 include text, images, video, or audio on web pages, web feeds, social networking information, messages, or other suitable data. Additional examples of content include user-generated content such as blogs, tweets, shared images, video or audio, social networking posts, and social networking status updates. Content provided by a source 110 may be received from a publisher (e.g., stories about news events, product information, entertainment, or educational material) and distributed by the source 110, or a source 110 may be a publisher of content it generates. For convenience, content from a source, regardless of its composition, may be referred to herein as an "article," a "content item," or as "content." A content item may include various types of content, such as text, images, and video.

The sources 110 communicate with the client device 130 and the digital magazine server 140 via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The client device 130 is one or more computing devices capable of receiving user input as well as transmitting and/or receiving data via the network 120. In one embodiment, the client device 130 is a conventional computer system, such as a desktop or a laptop computer. Alternatively, the client device 130 may be a device having computer functionality, such as a personal digital assistant (PDA), a mobile telephone, a smartphone or another suitable device. In one embodiment, the client device 130 executes an application allowing a user of the client device 110 to interact with the digital magazine server 140. For example, an application executing on the client device 130 communicates instructions or requests for content items to the digital magazine server 140 to modify content presented to a user of the client device 130. As another example, the client device 130 executes a browser that receives pages from the digital magazine server 140 and presents the pages to a user of the client device 130. In another embodiment, the client device 130 interacts with the digital magazine server 140 through an application programming interface (API) running on a native operating system of the client device 130, such as IOS® or ANDROID™. While FIG. 1 shows a single client device 130, in various embodiments, any number of client devices 130 may communicate with the digital magazine server 140.

A display device 132 included in the client device 130 presents content items to a user of the client device 130. Examples of the display device 132 include a liquid crystal display (LCD), an organic light emitting diode (OLED) display, an active matrix liquid crystal display (AMLCD), or any other suitable device. Different client devices 130 may have display devices 132 with different characteristics. For example, different client devices 132 have display devices 132 with different display areas, different resolutions, or differences in other characteristics.

One or more input devices 134 included in the client device 130 receive input from the user. Different input devices 134 may be included in the client device 130. For example, the client device 130 includes a touch-sensitive display for receiving input data, commands, or information from a user. Using a touch-sensitive display allows the client device 130 to combine the display device 132 and an input device 134, simplifying user interaction with presented content items. In other embodiments, the client device 130 may include a keyboard, a trackpad, a mouse, or any other device capable of receiving input from a user. In another example, the input device 134 is configured to receive information from a user of the client device through a touchless interface. Examples of a touchless interface include sensors, such as an image capture device, to receive gestures from a client device user without the user physically contacting the display device 132 or the client device 130. Additionally, the client device may include multiple input devices 134 in some embodiments. Inputs received via the input device 134 may be processed by a digital magazine application associated with the digital magazine server 140 and executing on the client device 130 to allow a client device user to interact with content items presented by the digital magazine server 140.

The digital magazine server 140 receives content items from one or more sources 110, generates pages in a digital magazine by processing the received content, and provides the pages to the client device 130. As further described below in conjunction with FIG. 2, the digital magazine server 140 generates one or more pages for presentation to a user based on content items obtained from one or more sources 110 and information describing organization and presentation of content items. For example, the digital magazine server 140 determines a page layout specifying positioning of content items relative to each other based on information associated with a user and generates a page including the content items arranged according to the determined layout for presentation to the user via the client device 130. This allows the user to access content items via the client device 130 in a format that enhances the user's interaction with and consumption of the content items. For example, the digital magazine server 140 provides a user with content items in a format similar to the format used by print magazines. By presenting content items in a format similar to a print magazine, the digital magazine server 140 allows a user to interact with content items from multiple sources 110 via the client device 130 with less inconvenience from horizontally or vertically scrolling to access various content items.

Figure 2:
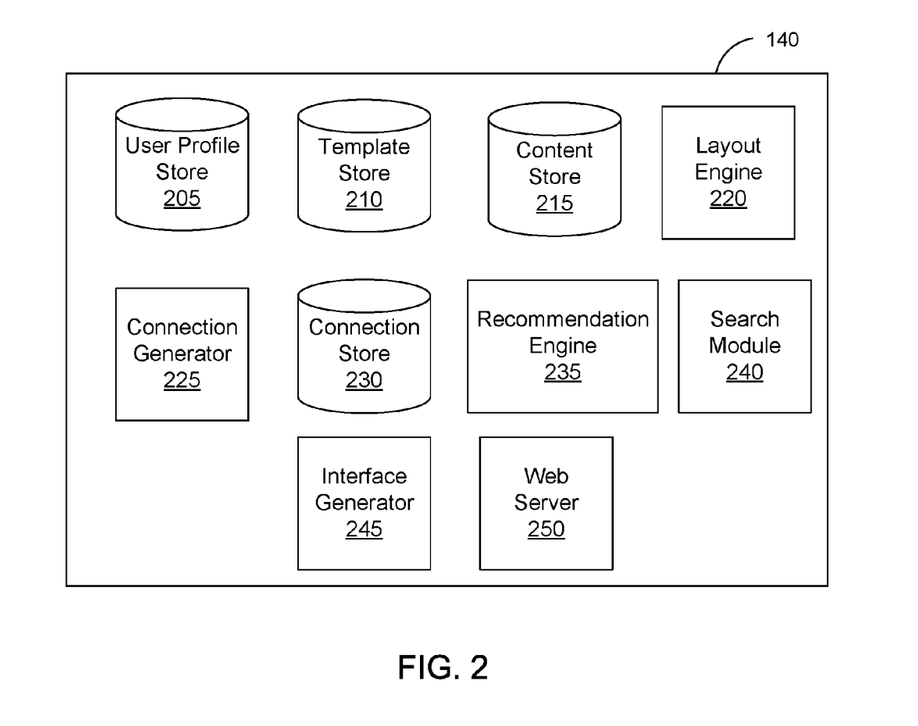
FIG. 2 is a block diagram of a digital magazine server, in accordance with an embodiment of the invention.

FIG. 2 is a block diagram of an architecture of the digital magazine server 140. The digital magazine server 140 shown in FIG. 2 includes a user profile store 205, a template store 210, a content store 215, a layout engine 220, a connection generator 225, a connection store 230, a recommendation engine 235, a search module 240, an interface generator 245, and a web server 250. In other embodiments, the digital magazine server 140 may include additional, fewer, or different components for various applications. Conventional components such as network interfaces, security functions, load balancers, failover servers, management and network operations consoles, and the like are not shown so as to not obscure the details of the system architecture.

Each user of the digital magazine server 140 is associated with a user profile, which is stored in the user profile store 205. A user profile includes declarative information about the user that was explicitly shared by the user and may also include profile information inferred by the digital magazine server 140. In one embodiment, a user profile includes multiple data fields, each describing one or more attributes of the corresponding social networking system user. Examples of information stored in a user profile include biographic, demographic, and other types of descriptive information, such as gender, hobbies or preferences, location, or other suitable information. A user profile in the user profile store 205 also includes data describing interactions by a corresponding user with content items presented by the digital magazine server 140. For example, a user profile includes a content item identifier, a description of an interaction with the content item corresponding to the content item identifier, and a time when the interaction occurred.

While user profiles in the user profile store 205 are frequently associated with individuals, allowing individuals to provide and receive content items via the digital magazine server 140, user profiles may also be stored for entities such as businesses or organizations. This allows an entity to provide or access content items via the digital magazine server 140. An entity may post information about itself, about its products or provide other content items associated with the entity to users of the digital magazine server 140. For example, users of the digital magazine server 140 may receive a digital magazine or section including content items associated with an entity via the digital magazine server 140.

The template store 210 includes page templates each describing a spatial arrangement ("layout") of content items relative to each other on a page for presentation by a client device 130. A page template includes one or more slots, each configured to present one or more content items. In some embodiments, slots in a page template may be configured to present a particular type of content item or to present a content item having one or more specified characteristics. For example, a slot in a page template is configured to present an image while another slot in the page template is configured to present text data. Each slot has a size (e.g., small, medium, or large) and an aspect ratio. One or more page templates may be associated with types of client devices 130, allowing content items to be presented in different relative locations and with different sizes when the content items are viewed using different client devices 130. Additionally, page templates may be associated with sources 110, allowing a source 110 to specify the format of pages presenting content items received from the source 110. For example, an online retailer is associated with a page template to allow the online retailer to present content items via the digital magazine server 140 with a specific organization. Examples of page templates are further described in U.S. patent application Ser. No. 13/187,840, filed on Jul. 21, 2011, and U.S. patent application Ser. No. 13/938,227, filed on Jul. 9, 2103, each of which is hereby incorporated by reference in its entirety.

The content store 215 stores objects that each represent various types of content. For example, the content store 215 stores content items received from one or more sources 110 within a threshold time of a current time. Examples of content items stored by the content store 215 include a page post, an image, a status update, a photograph, a video, a link, an article, video data, audio data, a check-in event at a location, or any other type of content. A user may specify a section including content items having a common characteristic, and the common characteristic is stored in the content 215 store along with an association with the user profile or the user specifying the section.

The layout engine 220 retrieves content items from one or more sources 110 or from the content store 215 and generates a page including the content items based on a page template from the template store 210. Based on the retrieved content items, the layout engine 220 may identify candidate page templates from the template store 210, score the candidate page templates based on characteristics of the slots in different candidate page templates and based on characteristics of the content items. Based on the scores associated with candidate page templates, the layout engine 220 selects a page template and associates the retrieved content items with one or more slots to generate a page where the retrieved content items are presented relative to each other and sized based on their associated slots. When associating a content item with a slot, the layout engine 220 may associate the content item with a slot configured to present a specific type of content item or to present content items having one or more specified characteristics. Examples of using a page template to present content items are further described in U.S. patent application Ser. No. 13/187,840, filed on Jul. 21, 2011, U.S. patent application Ser. No. 13/938,223, filed on Jul. 9, 2013, and U.S. patent application Ser. No. 13/938,226, filed on Jul. 9, 2013, each of which is hereby incorporated by reference in its entirety.

In some embodiments, the layout engine 220 also determines a dominant color associated with images, or sections of those images, obtained from one or more sources 110 or from the content store 215. The images may be included in content items or may be individual images. For each pixel in an image, or for each of a subset of pixels sampled from the image, the layout engine 220 identifies one or more color components and generates a vector associated with a pixel based on the color components. Clusters including one or more of the pixels are generated based on the vectors associated with each pixel, and a characteristic vector is generated for each cluster based on the vectors associated with pixels in a cluster. The characteristic vector for a cluster specifies a color associated with the cluster. Based on the characteristic vectors, the layout engine 220 selects a set of clusters and determines a centroid based on the characteristic vectors of the clusters in the set. The centroid identifies a dominant color associated with the image. Determination of a dominant color of an image is further described below in conjunction with FIG. 4.

The connection generator 225 monitors interactions between users and content items presented by the digital magazine server 140. Based on the interactions, the connection generator 225 determines connections between various content items, connections between users and content items, or connections between users of the digital magazine server 140. For example, the connection generator 225 identifies when users of the digital magazine server 140 provide feedback about a content item, access a content item, share a content item with other users, or perform other actions with content items. In some embodiments, the connection generator 225 retrieves data describing user interaction with content items from the user's user profile in the user profile store 205. Alternatively, user interactions with content items are communicated to the connection generator 225 when the interactions are received by the digital magazine server 140. The connection generator 225 may account for temporal information associated with user interactions with content items. For example, the connection generator 225 identifies user interactions with a content item within a specified time interval or applies a decay factor to identified user interactions based on times associated with interactions. The connection generator 225 generates a connection between a user and a content item if the user's interactions with the content item satisfy one or more criteria. In one embodiment, the connection generator 225 determines one or more weights specifying a strength of the connection between the user and the content item based on user interactions with the content item that satisfy one or more criteria. Generation of connections between a user and a content item is further described in U.S. patent application Ser. No. 13/905,016, filed on May 29, 2013, which is hereby incorporated by reference in its entirety.

If multiple content items are connected to a user, the connection generator 225 establishes implicit connections between each of the content items connected to the user. In one embodiment, the connection generator 225 maintains a user content graph identifying the implicit connections between content items connected to a user. In one embodiment, weights associated with connections between a user and content items are used to determine weights associated with various implicit connections between content items. User content graphs for multiple users of the digital magazine server 140 are combined to generate a global content graph describing connections between various content items provided by the digital magazine server 140 based on user interactions with various content items. For example, the global content graph is generated by combining user content graphs based on mutual connections between various content items in user content graphs.

In one embodiment, the connection generator 225 generates an adjacency matrix from the global content graph or from multiple user content graphs and stores the adjacency matrix in the connection store 230. The adjacency matrix describes connections between content items. For example, the adjacency matrix includes identifiers of content items and weights representing the strength or closeness of connections between content items based on the global content graph. As an example, the weights indicate a degree of similarity in subject matter or similarity of other characteristics associated with various content items. In other embodiments, the connection store 230 includes various adjacency matrices determined from various user content graphs; the adjacency matrices may be analyzed to generate an overall adjacency matrix for content items provided by the digital magazine server 140. Graph analysis techniques may be applied to the adjacency matrix to rank content items, to recommend content items to a user, or to otherwise analyze relationships between content items. An example of the adjacency matrix is further described in U.S. patent application Ser. No. 13/905,016, filed on May 29, 2013, which is hereby incorporated by reference in its entirety.

In addition to identifying connections between content items, the connection generator 225 may also determine a social proximity between users of the digital magazine server 140 based on interactions between users and content items. The digital magazine server 140 determines social proximity, or "social distance," between users using a variety of techniques. For example, the digital magazine server 140 analyzes additional users connected to each of two users of the digital magazine server 140 within a social networking system to determine the social proximity of the two users. In another example, the digital magazine server 140 determines social proximity between a user and an additional user by analyzing the user's interactions with content items posted by the additional user, whether the content items are presented using the digital magazine server 140 or using another social networking system. Additional examples for determining social proximity between users of the digital magazine server 140 are described in U.S. patent application Ser. No. 13/905,016, filed on May 29, 2013, which is incorporated by reference in its entirety. In one embodiment, the connection generator 225 determines a connection confidence value between a user and an additional user of the digital magazine server 140 based on the user's and the additional user's common interactions with particular content items. The connection confidence value may be a numerical score representing a measure of closeness between the user and the additional user. For example, a larger connection confidence value indicates a greater similarity between the user and the additional user. In one embodiment, if a user has at least a threshold connection confidence value with another user, the digital magazine server 140 stores a connection between the user and the additional user in the connection store 230.

Using data from the connection store 230, the recommendation engine 235 identifies content items from one or more sources 110 for recommending to a digital magazine server user. Hence, the recommendation engine 235 identifies content items potentially relevant to a user. In one embodiment, the recommendation engine 235 retrieves data describing interactions between a user and content items from the user's user profile and data describing connections between content items, and/or connections between users from the connection store 230. In one embodiment, the recommendation engine 235 uses stored information describing content items (e.g., topic, sections, subsections) and interactions between users and various content items (e.g., views, shares, saved, links, topics read, or recent activities) to identify content items that may be relevant to a digital magazine server user. For example, content items having an implicit connection of at least a threshold weight to a content item with which the user interacted are recommended to the user. As another example, the recommendation engine 235 presents a user with content items having one or more attributes in common with a content item with which an additional user having a threshold connection confidence score with the user interacted. Recommendations for additional content items may be presented to a user when the user views a content item using the digital magazine, may be presented as a notification to the user by the digital magazine server 140, or may be presented to the user through any suitable communication channel.

In one embodiment, the recommendation engine 235 applies various filters to content items received from one or more sources 110 or from the content store 215 to efficiently provide a user with recommended content items. For example, the recommendation engine 235 analyzes attributes of content items in view of characteristics of a user retrieved from the user's user profile. Examples of attributes of content items include a type (e.g., image, story, link, video, audio, etc.), a source 110 from which a content item was received, time when a content item was retrieved, and subject matter of a content item. Example characteristics of a user include biographic information about the user, users connected to the user, and interactions between the user and content items. In one embodiment, the recommendation engine 235 analyzes attributes of content items in view of a user's characteristics for a specified time period to generate a set of recommended content items. The set of recommended content items may be presented to the user or may be further analyzed based on user characteristics and on content item attributes to generate more refined set of recommended content items. A setting included in a user's user profile may specify a length of time that content items are analyzed before identifying recommended content items to the user, allowing a user to balance refinement of recommended content items with time used to identify recommended content items.

The search module 240 receives a search query from a user and retrieves content items from one or more sources 110 based on the search query. For example, content items having at least a portion of an attribute matching at least a portion search query are retrieved from one or more sources 110. The user may specify sources 110 from which content items are received through settings maintained by the user's user profile or by identifying one or more sources in the search query. In one embodiment, the search module 240 generates a section of the digital magazine including the content items identified based on the search query, as the identified content items have a common attribute of their association with the search query. Presenting identified content items identified from a search query allows a user to more easily identify additional content items at least partially matching the search query when additional content items are provided by sources 110.

To more efficiently identify content items based on search queries, the search module 240 may index content items, groups (or sections) of content items, and user profile information. In one embodiment, the index includes information about various content items, such as author, source, topic, creation data/time, user interaction information, document title, or other information capable of uniquely identifying the content item. Search queries are compared to information maintained in the index to identify content items for presentation to a user. The search module 240 may present identified content items based on a ranking. One or more factors associated with the content items may be used to generate the ranking. Examples of factors include: global popularity of a content item among users of the digital magazine server 140, connections between users interacting with a content item and the user providing the search query, and information from a source 110. Additionally, the search module 240 may assign a weight to the index information associated with each content item selected based on similarity between the index information and a search query and rank the content items based on their weights. For example, content items identified based on a search query are presented in a section of the digital magazine in an order based in part on the ranking of the content items.

To increase user interaction with the digital magazine, the interface generator 245 maintains instructions associating received input with actions performed by the digital magazine server 140 or by a digital magazine application executing on a client device 130. For example, instructions maintained by the interface generator 245 associate types of inputs or specific inputs received via an input device 132 of a client device 130 with modifications to content presented by a digital magazine. As an example, if the input device 132 is a touch-sensitive display, the interface generator 245 includes instructions associating different gestures with navigation through content items or presented via a digital magazine. Instructions from the interface generator 245 are communicated to a digital magazine application or other application executing on a client device 130 on which content from the digital magazine server 140 is presented. Inputs received via an input device 132 of the client device 130 are processed based on the instructions when content items are presented via the digital magazine server 140 is presented to simplify user interaction with content presented by the digital magazine server 140.

The web server 250 links the digital magazine server 140 via the network 120 to the one or more client devices 130, as well as to the one or more sources 110. The web server 250 serves web pages, as well as other content, such as JAVA®, FLASH®, JSON, XML, and so forth. The web server 250 may retrieve content item from one or more sources 110. Additionally, the web server 250 communicates instructions for generating pages of content items from the layout engine 220 and instructions for processing received input from the interface generator 245 to a client device 130 for presentation to a user. The web server 250 also receives requests for content or other information from a client device 130 and communicates the request or information to components of the digital magazine server 140 to perform corresponding actions. Additionally, the web server 250 may provide application programming interface (API) functionality to send data directly to native client device operating systems, such as IOS®, ANDROID™, WEBOS®, or BlackberryOS.

For purposes of illustration, FIG. 2 describes various functionalities provided by the digital magazine server 140. However, in other embodiments, the above-described functionality may be provided by a digital magazine application executing on a client device 130, or may be provided by a combination of the digital magazine server 140 and a digital magazine application executing on a client device 130. In one embodiment, the digital magazine server 140 determines a dominant color in an image of a content item based on color components of pixels in the image. For example, the layout engine 220 determines a dominant color in an image based on clusters of pixels in the image determined from color components of pixels in the image. In another embodiment, a digital magazine application executing on the client device 130 determines a dominant color in an image of a content item based on color components of pixels in the image. Alternatively, the digital magazine server 140 and the client device 130 operate in conjunction with each other to determine a dominant color in an image of a content item based on color components of pixels in the image. For example, certain functionality (e.g. determining the dominant color) is performed by the digital magazine server 140, while other functionality (e.g., presenting an image modified based on the dominant color) is performed by a digital magazine application executing on the client device 130.

Page Templates

Figure 3:
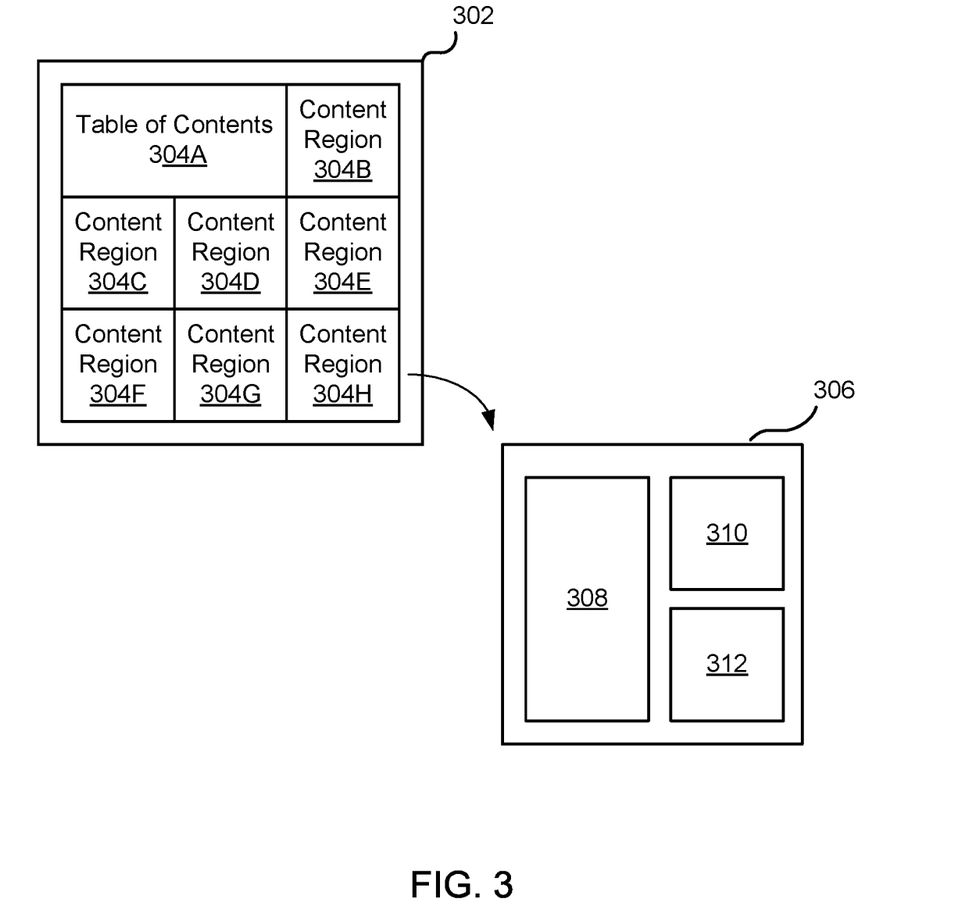
FIG. 3 is an example of presentation of content items in a digital magazine using a page template, in accordance with an embodiment of the invention.

FIG. 3 illustrates an example page template 302 having multiple rectangular slots each configured to present a content item. Other page templates with different configurations of slots may be used by the digital magazine server 140 to present one or more content items received from sources 110. As described above in conjunction with FIG. 2, in some embodiments, one or more slots in a page template are reserved for presentation of content items having specific characteristics or for presentation of a specific type of content item. In one embodiment, the size of a slot may be specified as a fixed aspect ratio or using fixed dimensions. Alternatively, the size of a slot may be flexible, where the aspect ratio or one or more dimensions of a slot is specified as a range, such as a percentage of a reference or a base dimension. Arrangement of slots within a page template may also be hierarchical. For example, a page template is organized hierarchically, where an arrangement of slots may be specified for the entire page template or for one or more portions of the page template.

In the example of FIG. 3, when a digital magazine server 140 generates a page for presentation to a user, the digital magazine server 140 populates slots in a page template 302 with content items. Information identifying the page template 302 and associations between content items and slots in the page template 302 is stored and used to generate the page. For example, to present a page to a user, the layout engine 220 identifies the page template 302 from the template store 210 and retrieves content items from one or more sources 110 or from the content store 215. The layout engine 220 generates data or instructions associating content items with slots within the page template 302. Hence, the generated page includes various "content regions" presenting one or more content items associated with a slot in a location specified by the slot.

A content region 304 may present image data, text, data, a combination of image and text data, or any other information retrieved from a corresponding content item. For example, in FIG. 3, the content region 304A represents a table of contents identifying sections of a digital magazine, and content associated with the various sections are presented in content regions 304B-304H. For example, content region 304A includes text or other data indicating that the presented data is a table of contents, such the text "Cover Stories Featuring," followed by one or more identifiers associated with various sections of the digital magazine. In one embodiment, an identifier associated with a section describes a characteristic common to at least a threshold number of content items in the section. For example, an identifier refers to the name of a user of social network from which content items included in the section are received. As another example, an identifier associated with a section specifies a topic, an author, a publisher (e.g., a newspaper, a magazine) or other characteristic associated with at least a threshold number of content items in the section. Additionally, an identifier associated with a section may further specify content items selected by a user of the digital magazine server 140 and organized as a section. Content items included in a section may be related topically and include text and/or images related to the topic.

Sections may be further organized into subsections, with content items associated with one or more subsections presented in content regions. Information describing sections or subsections, such as a characteristic common to content items in a section or subsection, may be stored in the content store 215 and associated with a user profile to simplify generation of a section or subsection for the user. A page template associated with a subsection may be identified, and slots in the page template associated with the subsection used to determine presentation of content items from the subsection relative to each other. Referring to FIG. 3, the content region 304H includes a content item associated with a newspaper to indicate a section including content items retrieved from the newspaper. When a user interacts with the content region 304, a page template associated with the section is retrieved, as well as content items associated with the section. Based on the page template associated with the section and the content items, the digital magazine server 140 generates a page presenting the content items based on the layout described by the slots of the page template. For example, in FIG. 3, the section page 306 includes content regions 308, 310, 312 presenting content items associated with the section. The content regions 308, 310, 312 may include content items associated with various subsections including content items having one or more common characteristics (e.g., topics, authors, etc.). Hence, a subsection may include one or more subsections, allowing hierarchical organization and presentation of content items by a digital magazine.

Figure 4:
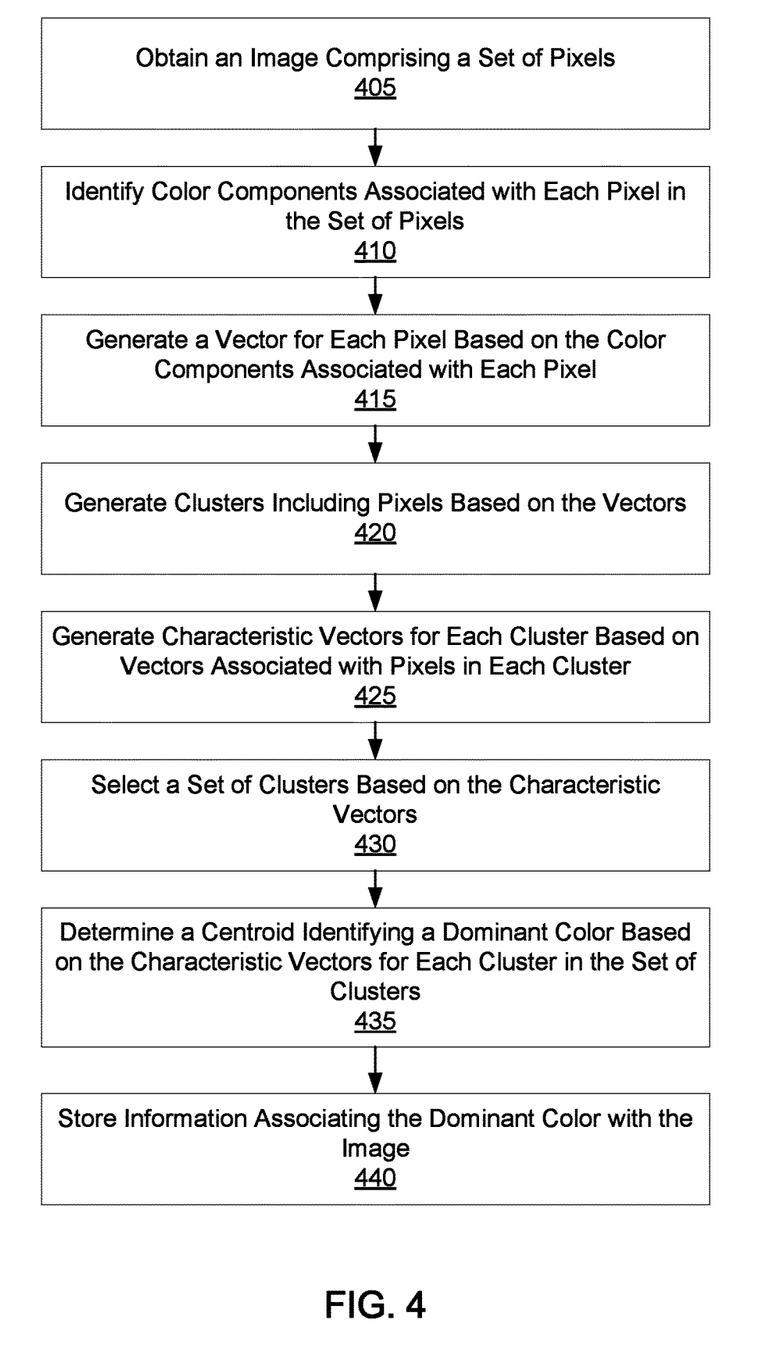
FIG. 4 is a flowchart of a method for determining a dominant color of an image, in accordance with an embodiment of the invention.

Determining a Dominant Color of an Image Using Color Components of Pixels in the Image FIG. 4 is a flowchart of one embodiment of a method for determining a dominant color of an image. In other embodiments, the method may include different and/or additional steps than those shown in FIG. 4. The functionality described in conjunction with the digital magazine server 140 in FIG. 4 may be provided by the layout engine 220 in one embodiment or may be provided by any other suitable component, or components, in other embodiments. Alternatively, the client device 130 executes one or more instructions associated with the digital magazine server 140, such as an application associated with the digital magazine server 140, to provide the functionality described in conjunction with FIG. 4.

The digital magazine server 140 obtains 405 an image, or a section of the image (e.g., for text overlays over the section of the image), including a set of pixels. For example, the image is obtained 405 for presentation to a user of the digital magazine server 140 for presentation to a user where the image includes a set of pixels. The image may be obtained 405 from a source 110, from another user of the digital magazine server 140, or from the digital magazine server 140. A color model is used to represent the image. Example color models include: red-green-blue (RGB), cyan-magenta-yellow-black (CMYK), CIE XYZ, HSV, HSL, or any other suitable mathematical model representing color. Based on the color model representing the image, each pixel in the image is represented by a number of color components each specifying a color and a color value identifying an intensity associated with the specified color. For example, in an image represented using the RGB color model, each pixel is associated with three color components having color values representing intensity of red, green, and blue colors. As another example, in an image represented using the CMYK color model, each pixel is associated with four color components having color values representing intensity of cyan, magenta, yellow, and black colors.

One or more color components associated with each pixel in the set of pixels of the image, or each pixel in a subset of the set of pixels determined by sampling of the set of pixels of the image (e.g., determined by sampling every N pixels from the set of pixels for computational efficiency or by pseudorandomly sampling pixels from the set of pixels), are identified 410 by the digital magazine server 140. As described above, the color components are determined based on a color model used to represent the image. For example, one or more color components specified by a color model associated with the image and their associated color values for various pixels of the image are identified 410 by the digital magazine server 140. The one or more color components and their color values may be extracted from the image, may be identified 410 based on data associated with the image by the digital magazine server 140, or may be identified 410 based on additional information retrieved with the image. For example, information identifying color components associated with the image is separately obtained from a source 110 associated with the image, which may allow the source 110 to customize or modify the color components identified 410 from the image. For example, information obtained in addition to the image identifies color components to exclude from identification 410. In some embodiments, color components having at least a threshold color value are identified 410, while color components with less than the threshold color value are not identified 410.

Based at least in part on the one or more color components associated with each pixel, the digital magazine server 140 generates 415 a vector for each pixel. Thus, a vector associated with a pixel is determined based on a vector space having a number of dimensions defined by a number of the identified color components. The vector associated with a pixel is then based on coordinates in the vector space corresponding to color values of identified color components corresponding to each dimension in the vector space. In one embodiment, when generating the vector associated with a pixel, the digital magazine server 140 normalizes the color components associated with the pixel. The digital magazine server 140 may account for color components or one or more additional pixels within a threshold distance of a pixel when generating 415 the vector for the pixel. For example, identified color components associated with pixels adjacent to a pixel are used when determining the vector associated with the pixel, or color components associated with additional pixels within a threshold number of pixels from the pixel are used when generating the vector associated with the pixel. Identified color components associated with the pixel and with additional pixels within the threshold distance of the pixel may be differently weighted when generating the vector associated with the pixel. For example, one or more weights are associated with color components of a pixel and additional weights are associated with one or more color components of additional pixels within a threshold distance of the pixels. An additional weight associated with one or more color components of additional pixel may be based on a distance between the additional pixel and the pixel. For example, an additional weight associated with one or more color components of an additional pixel is inversely proportional to a distance between the additional pixel and the pixel. The vector for the pixel may be generated 415 by combining the one or more color components of the pixel and of the additional pixels using the weights and the additional weights.

Based on the vectors associated with various pixels, the digital magazine server 140 generates 420 one or more clusters each including one or more pixels. In one embodiment, K-means clustering is used to generate 420 the one or more clusters of pixels based on the generated vectors representing the various pixels. K-means clustering determines whether a pixel is included in a cluster based on the distance between a vector associated with the pixel and a mean value associated with the cluster. For example, a pixel associated with a vector having less than a threshold distance between the vector and a mean value associated with the cluster is included in the cluster. A cluster may also be associated with a threshold number of pixels associated with the cluster, a threshold magnitude (i.e., a sum of magnitudes of vectors associated with pixels included in the cluster is less than or equal to the threshold magnitude), a threshold distance from a mean value of the cluster, or any combination thereof. In other embodiments, alternative clustering methods may be used to generate 420 the clusters. Examples of alternative clustering methods include: a balanced iterative reducing and clustering using hierarchies (BIRCH) method, a hierarchical method, an expectation-maximization (EM) method, a density-based spatial clustering of applications with noise (DBSCAN) method, an ordering points to identify the clustering structure (OPTICS) method, and a mean-shift clustering method.

The digital magazine server 140 generates 425 characteristic vectors for each cluster based at least in part on the generated vectors. A characteristic vector for a cluster is based at least in part on the vectors associated with the one or more pixels included in the cluster and represents a color associated with the cluster determined from dimensions of the characteristic vector. The characteristic vector for a cluster may be based on combinations of one or more dimensions of the generated vectors. For example, a dimension of the characteristic vector of a cluster is a combination of one or more of the corresponding dimensions of the generated vectors of the cluster. The combination may be a sum or a weighted sum of the one or more corresponding dimensions of the vectors associated with pixels included in the cluster.

Based at least in part on the characteristic vectors associated with various clusters, the digital magazine server 140 selects 430 a set of the clusters. In one embodiment, the one or more clusters are ranked based on their associated characteristic vectors, and clusters having at least a threshold position in the ranking are selected 430 as the set. Alternatively, clusters having a characteristic vector with at least a threshold magnitude are selected 430 as the set. Alternatively, a score is generated for each cluster based on a magnitude of a cluster's characteristic vector, a dimension of the cluster's characteristic vector, a number of pixels in the cluster, or any combination thereof. For example, a score of a cluster having a greater number of pixels and a lower magnitude than an additional cluster is higher than the score of the additional cluster. The digital magazine server 140 selects 430 clusters having at least a threshold score for the set or ranks clusters based on their scores and selects 430 clusters having at least a threshold position in the ranking for the set.

The digital magazine server 140 determines 435 a centroid based on the characteristic vectors of each cluster in the selected set of clusters. The centroid identifies a dominant color associated with the image. For example, different dimensions of the characteristic vectors may be differently weighted, so the centroid is determined 425 based on values of the characteristic vectors of clusters in the dimensions along with weights associated with the dimensions. In some embodiments, if a magnitude of a characteristic vector has greater than a threshold difference from magnitudes of at least a threshold number of additional characteristic vectors, the characteristic vector is excluded or attenuated when determining 435 the centroid. In an alternative embodiment, the digital magazine server 140 selects 430 a cluster based at least in part on the characteristic vector of the cluster and determines the dominant color associated with the image based on the characteristic vector of the selected cluster. For example, the digital magazine server 140 selects a cluster from the set of clusters including a maximum number of pixels and identifies the characteristic vector of the selected color as identifying the dominant color associated with the image The digital magazine server 140 stores 440 information associating the dominant color with the image. The information may identify the dominant color, regions of the image including the dominant color, or any combination thereof. For example, the information may also include a location within the image having a maximum number of adjacent pixels each associated with colors matching or similar to the dominant color. Based on the information, the digital magazine server 140 may modify the image. For example, the digital magazine server 140 selects additional content for inclusion in the image based at least in part on the dominant color. As an example, the digital magazine server 140 selects a color for text to overlay on the image based at least in part on the dominant color. A color for the text contrasting with the dominant color may be selected by the digital magazine server 140. Various elements may be selected for inclusion in the image based on the dominant color. Example elements include borders, text, and additional images. The digital magazine server 140 may also select additional content items to present to the user along with the image based at least in part on the dominant color associated with the image. For example, the digital magazine server 140 selects additional content items including images with different or similar dominant colors to present color-varying content items or content items with similar colors.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   obtaining a content item for presentation to a user, wherein the obtained content item includes an image comprising a plurality of pixels;
   identifying one or more color components associated with each pixel in the plurality of pixels;
   generating a characteristic vector for each sub-set of pixels, a characteristic vector for a sub-set of pixels specifying a color associated with a plurality of pixels in the sub-set by:
   associating weights with the one or more color components associated with an identified pixel of the sub-set;
   associating one or more additional weights with the one or more color components associated with one or more additional pixels of the sub-set; and
   generating a vector for the identified pixel based at least in part on the weights, the one or more color components associated with the identified pixel, the one or more additional weights, and the one or more color components associated with the one or more additional pixels
   ranking the generated one or more sub-sets of pixels based on magnitudes of the characteristic vectors of the one or more sub-sets of pixels; and
   selecting one or more sub-sets of pixels having at least a threshold position in the ranking;
   determining a dominant color associated with the image based on the characteristic vectors for a selected number of sub-sets of pixels;
   selecting an element for inclusion in the image based on the dominant color associated with the image; and
   generating a modified image including the image and the selected element.

2. The method of claim 1, wherein determining a dominant color associated with the image based on the characteristic vectors for a selected number of sub-sets of pixels comprises:
   determining a centroid based on the characteristic vector for each sub-set of pixels in the selected number of sub-sets of pixels, the centroid identifying a dominant color associated with the image.

3. The method of claim 1, wherein the one or more color components associated with a pixel of the image are identified from a set of color components associated with each pixel in the image based on a color model representing the image.

4. The method of claim 1, wherein generating a characteristic vector for each sub-set of pixels comprises:
   generating a vector for each identified pixel based at least in part on the one or more color components associated with each identified pixel and one or more color components of one or more additional pixels within a threshold distance of each identified pixel; and
   generating one or more sub-sets of pixels, each sub-set including one or more pixels based at least in part on the generated vectors.

5. The method of claim 4, wherein generating the one or more sub-sets of pixels comprises:
   determining whether to include a pixel in a sub-set of pixels based on a distance between a vector associated with the pixel and a mean value associated with the sub-set of pixels.

6. The method of claim 4, wherein a sum of magnitudes of vectors associated with pixels included in a sub-set of pixels is less than a threshold value.

7. The method of claim 4, further comprising:
   selecting the selected number of the sub-sets of pixels based at least in part on the characteristic vectors, wherein selecting the selected number of the sub-sets of pixels comprises:
   scoring the generated one or more sub-sets of pixels based on the characteristic vectors of the generated one or more sub-sets of pixels and a number of pixels included in each sub-set;
   ranking the generated one or more sub-sets of pixels based on the scores; and
   selecting one or more sub-sets of pixels having at least a threshold position in the ranking.

8. The method of claim 1, wherein selecting the element for inclusion in the image based at least in part on the dominant color associated with the image comprises:
   associating a color with the element that contrasts with the dominant color.

9. A non-transitory computer readable storage medium storing executable computer program instructions, the computer program instructions comprising instructions that when executed cause a computer processor to:
   obtain a content item for presentation to a user, wherein the obtained content item includes an image comprising a plurality of pixels;
   identify one or more color components associated with each pixel in the plurality of pixels;
   generate a characteristic vector for each sub-set of pixels, a characteristic vector for a sub-set of pixels specifying a color associated with a plurality of pixels in the sub-set by:

associating weights with the one or more color components associated with an identified pixel of the sub-set;

associating one or more additional weights with the one or more color components associated with one or more additional pixels of the sub-set; and generating a vector for the identified pixel based at least in part on the weights, the one or more color components associated with the identified pixel, the one or more additional weights, and the one or more color components associated with the one or more additional pixels ranking the generated one or more sub-sets of pixels based on magnitudes of the characteristic vectors of the one or more sub-sets of pixels; and selecting one or more sub-sets of pixels having at least a threshold position in the ranking;

determine a dominant color associated with the image based on the characteristic vectors for a selected number of sub-sets of pixels;

selecting an element for inclusion in the image based on the dominant color associated with the image; and generating a modified image including the image and the selected element.

10. The computer readable medium of claim 9, wherein the instructions that cause the processor to determine a dominant color associated with the image based on the characteristic vectors for a selected number of sub-sets of pixels comprise instructions that cause the processor to:

determine a centroid based on the characteristic vectors for each sub-set of pixels in the selected number of sub-sets of pixels, the centroid identifying a dominant color associated with the image.

11. The computer readable medium of claim 9, wherein the one or more color components associated with a pixel of the image are identified from a set of color components associated with each pixel in the image based on a color model representing the image.

12. The computer readable medium of claim 9, wherein the instructions that cause the processor to generate a characteristic vector for each sub-set of pixels comprise instructions that cause the processor to:

generate a vector for each identified pixel based at least in part on the one or more color components associated with each identified pixel and one or more color components of one or more additional pixels within a threshold distance of each identified pixel; and generate one or more sub-sets of pixels, each sub-set including one or more pixels based at least in part on the generated vectors.

13. The computer readable medium of claim 12, wherein the instructions that cause the processor to generate one or more sub-sets of pixels comprise instructions that cause the processor to:

determine whether to include a pixel in a sub-set of pixels based on a distance between a vector associated with the pixel and a mean value associated with the sub-set of pixels.

14. The computer readable medium of claim 12, wherein a sum of magnitudes of vectors associated with pixels included in a sub-set of pixels is less than a threshold value.

15. The computer readable medium of claim 12, wherein the instructions that cause the processor to generate a characteristic vector for each sub-set of pixels further comprise instructions that cause the processor to:

select the selected number of the sub-sets of pixels based at least in part on the characteristic vectors, wherein selecting the selected number of the sub-sets of pixels comprises instructions that cause the processor to:

score the generated one or more sub-sets of pixels based on the characteristic vectors of the generated one or more sub-sets of pixels and a number of pixels included in each sub-set;

rank the generated one or more sub-sets of pixels based on the scores; and select one or more sub-sets of pixels having at least a threshold position in the ranking.

16. The computer readable medium of claim 12, wherein the instructions that cause the processor to select the element for inclusion in the image based at least in part on the dominant color associated with the image comprises instructions that cause the processor to:

associate a color with the element that contrasts with the dominant color.

* * * * *

UNITED STATES PATENT AND TRADEMARK OFFICE
CERTIFICATE OF CORRECTION

PATENT NO. : 9,870,626 B2
APPLICATION NO. : 15/385396
DATED : January 16, 2018
INVENTOR(S) : Meng Guo It is certified that error appears in the above-identified patent and that said Letters Patent is hereby corrected as shown below:

On the Title Page

Under (57) Abstract, Line 3, after "in the image are identified" insert --and--.

Signed and Sealed this
Twenty-first Day of August, 2018

Andrei Iancu
*Director of the United States Patent and Trademark Office*